US012729959B2

(12) United States Patent
Ishii et al.

(10) Patent No.: US 12,729,959 B2
(45) Date of Patent: Sep. 8, 2026

(54) COATING FILM EVALUATION STRUCTURE AND EVALUATION METHOD

(71) Applicant: NTT, Inc., Tokyo (JP)

(72) Inventors: Azusa Ishii, Tokyo (JP); Shingo Mineta, Tokyo (JP); Soichi Oka, Tokyo (JP)

(73) Assignee: NTT, INC., Tokyo (JP)

( * ) Notice: Subject to any disclaimer, the term of this patent is extended or adjusted under 35 U.S.C. 154(b) by 459 days.

(21) Appl. No.: 18/256,246

(22) PCT Filed: Dec. 9, 2020

(86) PCT No.: PCT/JP2020/045813

§ 371 (c)(1),
(2) Date: Jun. 7, 2023

(87) PCT Pub. No.: WO2022/123678

PCT Pub. Date: Jun. 16, 2022

(65) Prior Publication Data

US 2024/0102797 A1 Mar. 28, 2024

(51) Int. Cl.
*G01N 17/00* (2006.01)
*G01B 21/08* (2006.01)

(52) U.S. Cl.
CPC ............ *G01B 21/08* (2013.01); *G01N 17/00* (2013.01)

(58) Field of Classification Search
CPC ........ G01B 21/08; G01B 5/066; G01N 17/00; B32B 27/18; B32B 27/281; B32B 27/283; B32B 27/302; B32B 27/308; B32B 27/322; B32B 27/34; B32B 27/40; B32B 2250/44; B32B 2255/00; B32B 2255/26; B32B 2307/402; B32B 2307/71; B32B 2307/7375; B32B 2307/7376; B32B 27/08; B32B 27/36
USPC ............. 73/762, 86, 129, 121, 146; 116/208
See application file for complete search history.

(56) References Cited

U.S. PATENT DOCUMENTS

2020/0108668 A1 4/2020 Wein

FOREIGN PATENT DOCUMENTS

| | | | | |
|---|---|---|---|---|
| CN | 102616088 A | | 8/2012 |
| JP | 2019045313 A | | 3/2019 |
| KR | 20200078634 A | * | 7/2020 |

OTHER PUBLICATIONS

Kobayashi, "Understanding! Useful! Introduction to Paint," Nikkan Kogyo Shimbun, 1st edition, 2018, 2 pages.

* cited by examiner

*Primary Examiner* — Robert R Raevis
(74) *Attorney, Agent, or Firm* — Slater Matsil, LLP

(57) ABSTRACT

A coating film evaluation structure includes a laminate including a first sheet, a second sheet, and a third sheet which are laminated. The second sheet is disposed on the first sheet, and the third sheet is disposed on the second sheet. In the laminate, the area of each sheet gradually reduces in the lamination direction, and a stepped portion is provided at an end portion. The coating film to be evaluated and the plurality of sheets have different colors. The coating film evaluation structure includes a coating film layer formed on the sheet having the largest area among the plurality of sheets so as to cover the other sheets and having a flat surface.

17 Claims, 4 Drawing Sheets

COATING FILM EVALUATION STRUCTURE AND EVALUATION METHOD

CROSS-REFERENCE TO RELATED APPLICATIONS

This application is a national phase entry of PCT Application No. PCT/JP2020/045813, filed on Dec. 9, 2020, which application is hereby incorporated herein by reference.

TECHNICAL FIELD

The present invention relates to a coating film evaluation structure and an evaluation method for evaluating a coating film.

BACKGROUND

Paints are applied to the surfaces of structures such as bridges, houses, buildings, ship hulls, aircraft fuselages, automobile bodies, home appliance bodies, and the like to prevent deterioration due to corrosion, ultraviolet rays, weathering, and the like. The surface is not limited to metals, and many materials such as concrete, wood, plastic, or the like, can be coated. By blocking oxygen, water, chloride ions, and the like, the coating film can protect an object which has been coated from deterioration such as corrosion (NPL 1).

However, since the coating film itself is also deteriorated by ultraviolet rays or water, the protective properties of the coating film gradually deteriorate over time. For this reason, in infrastructure facilities such as steel towers and bridges, in order to check whether or not a sufficient film thickness remains for protecting an object which has been coated, an inspection work for measuring the film thickness of the coating with a film thickness meter is performed. The film thickness measurement result of the coating film is one of the important indexes of maintenance such as re-coating.

CITATION LIST

Non Patent Literature

[NPL 1] Toshikatsu Kobayashi, "Understanding! Useful! Introduction to Paint," Nikkan Kogyo Shimbun, 1st edition, 2018.

SUMMARY

Technical Problem

Here, a film thickness meter of an electromagnetic type (electromagnetic induction type) or eddy current type is generally used for film thickness measurement. In order to obtain measurement accuracy, it is important for the film thickness meter of an electromagnetic type (electromagnetic induction type) or eddy current type to press the measuring probe perpendicularly against the object to be measured. In addition, the film thickness meter of an electromagnetic type (electromagnetic induction type) or eddy current type can measure only the portion to which the measuring probe is pressed (Japanese Patent No. 6222396).

However, in infrastructure structures such as steel towers or bridges, it is not easy to press a probe perpendicularly to a portion where the film thickness is to be evaluated. In addition, there is a case where unevenness due to brush marks during coating, pigments contained in the paint, etc. is larger than the wear amount of the film thickness, and the variation of the results due to the measurement points is large. In order to suppress the influence of the variation in the measurement result, it is generally necessary to perform repeated measurement at a plurality of locations, but such repeated measurements are accompanied by difficulties such as the time required for work.

Embodiments of the present invention have been made to solve the problem described above and an object thereof is to make it possible to perform the evaluation of the film thickness of a coating film more easily.

Solution to Problem

A coating film evaluation structure according to embodiments of the present invention is a coating film evaluation structure for evaluating a decrease in thickness of a coating film to be evaluated. The coating film evaluation structure includes a laminate including a plurality of laminated sheets, in which, in the laminate, an area of each sheet gradually reduces in a lamination direction, and a stepped portion is provided at an end portion, the coating film to be evaluated and the plurality of sheets have different colors, and each of the plurality of sheets has a known thickness.

An evaluation method according to embodiments of the present invention is a coating film evaluation method for evaluating a decrease in thickness of a coating film to be evaluated using the coating film evaluation structure described above. The coating film evaluation method includes a first step of installing the coating film evaluation structure in the vicinity of a structure on which the coating film to be evaluated is formed and a second step of evaluating an exposed state of the plurality of sheets due to a decrease in thickness of the coating film layer by checking colors of the plurality of sheets after the first step.

Advantageous Effects of Embodiments of the Invention

As described above, according to embodiments of the present invention, since an area of each sheet of a laminate including a plurality of laminated sheets gradually reduces in a lamination direction to provide a stepped portion at an end portion, and a coating film to be evaluated and the plurality of sheets have different colors, the evaluation of the film thickness of the coating film can be more easily performed.

DETAILED DESCRIPTION OF ILLUSTRATIVE EMBODIMENTS

Figure 1:
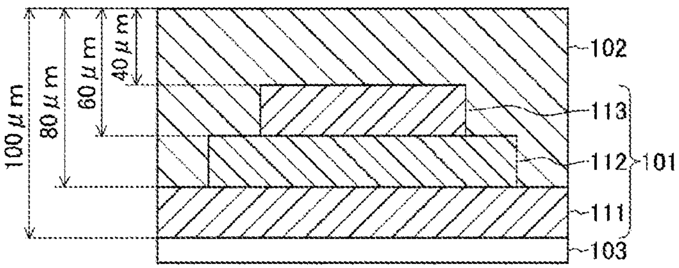
FIG. 1 is a cross-sectional view illustrating a configuration of a coating film evaluation structure according to an embodiment of the present invention.

A coating film evaluation structure according to an embodiment of the present invention will be described below with reference to FIGS. 1 and 2. The coating film evaluation structure is for evaluating a decrease in thickness of a coating film to be evaluated.

The coating film evaluation structure includes a laminate 101 including a first sheet 111, a second sheet 112, and a third sheet 113 which are laminated. Each of the plurality of sheets has a known thickness. For example, each of the first sheet 11, the second sheet 112, and the third sheet 113 has a thickness of 20 μm.

Here, in this example, the second sheet 112 is disposed on the first sheet 11, and the third sheet 113 is disposed on the second sheet 112. In addition, the second sheet 112 is disposed in contact with the first sheet 111, and the third sheet 113 is disposed in contact with the second sheet 112. In this example, three sheets are laminated, but embodiments of the present invention are not limited thereto, and two sheets may be laminated to form a laminate, or four or more sheets may be laminated to form a laminate.

In the laminate 101, the area of each sheet gradually reduces in the lamination direction, and a stepped portion is provided at an end portion. In this example, the area of the second sheet 112 is smaller than that of the first sheet 111, and the area of the third sheet 113 is smaller than that of the second sheet 112. For example, the first sheet 11 can be a square having one side of 6 cm in a plan view, the second sheet 112 can be a square having one side of 4 cm in a plan view, and the third sheet 113 can be a square having one side of 2 cm in a plan view. The planar shape of each sheet is not limited to a rectangular shape such as a square, and can be any shape such as a circular shape or an elliptical shape. It is preferable that the shapes of the respective sheets in a plan view be similar to each other from the viewpoint of ease in checking at the time of exposure.

Thus, by gradually reducing the area of each sheet in the lamination direction, a stepped portion can be formed at the end portion of the laminate. For example, by disposing a sheet having a small area at a center portion of the sheet having a large area in a plan view, a stepped portion can be formed all over the periphery of the laminate.

The coating film to be evaluated and the plurality of sheets have different colors. For example, these colors are made different from each other so that they can be checked by visual observation or the like. For example, when the color of the coating film to be evaluated is gray, the color of the first sheet 111 can be red, the color of the second sheet 112 can be green, and the color of the third sheet 113 can be blue.

Each of the plurality of sheets can be made of a polymer material containing any of a hydroxyl group, an amino group, a carboxyl group, a carbonyl group, an ether bond, an ester bond, a urethane bond, a urea bond, an aromatic ring, an amide bond, and an imide bond. The polymer material can be, for example, any of a polyester resin, a polyurethane resin, an acrylic resin, a fluorine resin, a silicone resin, alkyl silicate, acrylic silicate, an acrylic styrene resin, a styrene resin, a melamine resin, a polyamide resin, and a polyimide resin, or a composite thereof. Further, at least one of an ultraviolet absorber and a light stabilizer may be added to each of the plurality of sheets.

The coating film evaluation structure can include a coating film layer 102 formed on the sheet having the largest area among the plurality of sheets so as to cover the other sheets and having a flat surface. The coating film layer 102 is made of the same material as the coating film to be evaluated. An adhesive layer 103 formed on the rear surface of the sheet having the largest area among the plurality of sheets can be provided. In this example, the adhesive layer 103 is formed on the rear surface of the first sheet 11.

Here, in this example, the coating film layer 102 is formed on at least the first sheet 111 and covers the second sheet 112 and the third sheet 113. Further, although not illustrated, the coating film layer 102 can be formed by covering the laminate 101 including the first sheet 11, the second sheet 112, and the third sheet 113 on the adhesive layer 103. In either case, the surface of the coating film layer 102 is assumed to be formed flat by absorbing the step caused by the laminate 101.

The coating film evaluation structure according to the above-described embodiment is used, for example, by being disposed in the vicinity of a structure such as a building on which a coating film to be evaluated is formed. In this state, the thickness of the coating film layer 102 decreases due to the influence of the environment over a certain number of years, and when the laminate 101 is exposed, this state can be observed, and it can be seen that the thickness of the coating film layer 102 has decreased.

Figure 3:
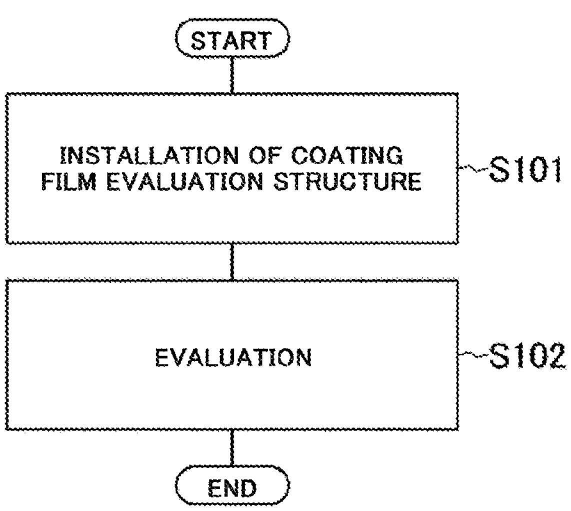
FIG. 3 is a flowchart illustrating an evaluation method according to an embodiment of the present invention.
Figure 4:
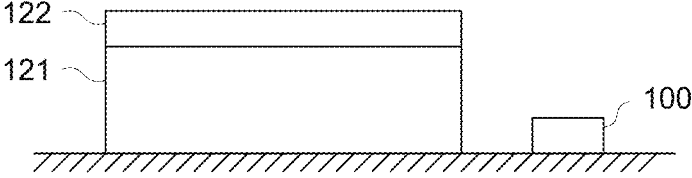
FIG. 4 is a diagram illustrating the first step of the evaluation method.

Subsequently, the evaluation method according to an embodiment of the present invention will be described with reference to FIG. 3. First, in a first step S101, the coating film evaluation structure 100 according to the above embodiment is installed in the vicinity of the structure 121 on which the coating film 122 to be evaluated is formed as shown in FIG. 4. Subsequently, in a second step S102, by checking the colors of the plurality of sheets (the first sheet 111, the second sheet 112, and the third sheet 113) for the exposed states of the plurality of sheets due to the decrease in thickness of the coating film layer 102, the decrease in thickness of the coating film 122 to be evaluated is evaluated.

Figure 2:
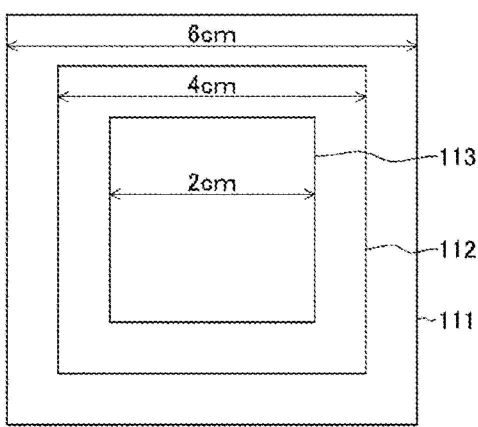
FIG. 2 is a plan view illustrating a partial configuration of the coating film evaluation structure according to an embodiment of the present invention.

For example, as illustrated in FIG. 1, when the initial thickness of the coating film layer 102 in a portion above the uppermost layer of the laminate 101 is 40 μm, if the blue color of the third sheet 113 can be visually checked, it can be seen that the thickness of the coating film layer 102 has decreased by at least 40 μm. Here, since the coating film layer 102 is made of the same material as the coating film to be evaluated, it can be determined (evaluated) that the thickness of the coating film to be evaluated in the vicinity where the coating film evaluation structure is disposed has similarly decreased by about 40 μm.

Thus, by using the coating film evaluation structure according to the embodiment, the wear condition of the coating film to be evaluated can be visually checked, for example. Therefore, compared to the related art, the inspection work time can be greatly shortened, and the evaluation of the film thickness of the coating film can be more easily performed.

For example, by setting the thickness of the coating film layer 102 and each sheet so that the laminate 101 (the first sheet 111, the second sheet 112, and the third sheet 113) is exposed in a stage where re-coating of a coating film to be evaluated reaches a desired wear amount, it is possible to easily determine the necessity of re-coating from the exposure state (exposed state) of the laminate 101.

The exposure state of the laminate 101 can be checked by an image captured by a camera or the like. For example, by processing an image captured by a camera or the like, it is possible to automatically (mechanically) determine (decide) the exposure state of the laminate 101. Since such check by an image is possible, for example, by using a drone equipped with an imaging device such as a camera, the coating film to be evaluated can be evaluated without an operator approaching a measurement point.

Experiments

More detailed description will be given below using results of experiments.

First, a polyester film colored in red and having a thickness of 20 μm was cut out into a square having a 6 cm length of one side to form the first sheet 111. A polyester film colored in green and having a thickness of 20 μm was cut out into a square having a 4 cm length of one side to form the second sheet 112. A polyester film colored in blue and having a thickness of 20 μm was cut out into a square having a 2 cm length of one side to form the third sheet 113. A film having adhesiveness was cut out into a square having 6 cm length of one side to form the adhesive layer 103.

Subsequently, the first sheet 11 was adhered to the adhesive layer 103 by overlapping it on the adhesive layer 103 in a state where there is no deviation in a plan view. Also, the second sheet 112 and the third sheet 113 were stacked on the first sheet 11 in a state where the centers of the sheets overlap each other in a plan view to form the laminate 101. Subsequently, a thick film type epoxy resin paint was applied on the first sheet 11 to form the coating film layer 102 covering the second sheet 112 and the third sheet 113. In this state, the second sheet 112 and the third sheet 113 are covered with the coating film layer 102 and cannot be checked (visually) from the outside.

On the other hand, a steel plate having a size of 7 cm×15 cm in a plan view was prepared, and two coated test pieces were prepared by applying a thick film type epoxy resin paint on the surface so as to have a film thickness of 120 μm. The above-mentioned coating film evaluation structure was adhered to one of the prepared coated test pieces by using the adhesive layer 103. The other coated test piece thus prepared was used for comparison.

A weather resistance test based on "JIS K 5600-7-7-A" was performed for 9000 hours on the two coated test pieces described above. In this test, two coated test pieces were taken out from the test environment at every 1000 hours of the test time, the appearance of the coating film evaluation structure was observed, and in addition, the thickness of the coating film of the coated test piece for comparison was measured using an electromagnetic film thickness meter.

The results of the tests (experiments) described above are shown in Table 1 below.

TABLE 1

| | Coating film evaluation structure | | Coated test piece for comparison | |
|---|---|---|---|---|
| Test time [hour] | Appearance (exposure state of laminate) | Wear amount of coating film calculated from exposure state of laminate | Film thickness measurement result [μm] | Wear amount calculated from film thickness [μm] |
| 0 | No exposure of laminate | — | 120 | 0 |
| 1000 | No exposure of laminate | Less than 40 μm | 113 | 7 |
| 2000 | No exposure of laminate | Less than 40 μm | 105 | 15 |
| 3000 | No exposure of laminate | Less than 40 μm | 96 | 24 |
| 4000 | No exposure of laminate | Less than 40 μm | 85 | 35 |
| 5000 | Exposure of blue sheet | 40 μm or more and less than 60 μm | 77 | 43 |
| 6000 | Exposure of blue sheet | 40 μm or more and less than 60 μm | 67 | 53 |
| 7000 | Exposure of green sheet | 60 μm or more and less than 80 μm | 58 | 62 |
| 8000 | Exposure of green sheet | 60 μm or more and less than 80 μm | 49 | 71 |
| 9000 | Exposure of red sheet | 80 μm or more | 38 | 82 |

As shown in Table 1, exposure of the blue sheet (the first sheet 111) was checked at a test time of 5000 hours. This indicates that the thickness of the coating film layer 102 has been reduced by 40 μm. On the other hand, the wear amount of the coating film of the coated test piece for comparison measured at a test time of 5000 hours was 43 μm.

In addition, exposure of the green sheet (the second sheet 112) was checked at a test time of 7000 hours. This indicates that the thickness of the coating film layer 102 has been reduced by 60 μm. On the other hand, the wear amount of the coating film of the coated test piece for comparison measured at a test time of 7000 hours was 62 μm.

In addition, exposure of the red sheet (the third sheet 113) was checked at a test time of 9000 hours. This indicates that the thickness of the coating film layer 102 has been reduced by 80 μm. On the other hand, the wear amount of the coating film of the coated test piece for comparison measured at a test time of 9000 hours was 82 μm.

As described above, the wear amount of the coating film to be evaluated, which was evaluated from the observation results of the appearance of the coating film evaluation structure under each condition of the test time of 5000 hours, 7000 hours, and 9000 hours, substantially coincided with the wear amount of the actual coating film. From the results, it was checked that the wear state of the film thickness of the coating film to be evaluated can be evaluated by observing the appearance of the coating film evaluation structure.

The coating film to be evaluated and each sheet have a color difference of $\Delta E^*ab \geq 20$, and thus the exposure state of each sheet can be easily checked visually. Note that "$\Delta E^*ab$" is a color difference notation defined by the International Commission on Illumination. Incidentally, any material can be used for forming the sheet, but if the sheet is rusted, it becomes difficult to check the exposure state of the sheet. Therefore, it is preferable that the sheet does not contain metal.

In addition, it is desirable that the coating film evaluation structure constitute a sheet from a material having flexibility (softness) so as to be stuck to the curved surface by using the adhesive layer, and from this point of view, it is preferable that the material of the sheet be a polymer material. Further, in order to secure the adhesion between the sheet and the coating film layer, a polymer material containing a polar functional group such as a hydroxyl group, an amino group, a carboxyl group, a carbonyl group, an ether bond, an ester bond, a urethane bond, a urea bond, an amide bond, and an imide bond, or an aromatic ring is more preferable.

Further, considering that the coating film evaluation structure is used outdoors, the sheet is also exposed to ultraviolet rays as the coating film to be evaluated and the coating film layer are worn. In such an environment, if the wear of the sheet is earlier than the wear of the coating film, the sheet, which is closer to the adhesive layer, is exposed at the portion where the sheet is worn, not the portion where the coating film is worn, leading to erroneous evaluation. For these reasons, it is desirable that the sheet have better light resistance than the coating film layer. In order to secure the light resistance of the sheet, it is desirable to add at least one of an ultraviolet absorber and a light stabilizer to the sheet.

In order to secure light resistance of the sheet, the polymer material constituting the sheet is preferably a polyester resin, a polyurethane resin, an acrylic resin, a fluorine resin, a silicone resin, alkyl silicate, acrylic silicate, an acrylic styrene resin, a styrene resin, a melamine resin, a polyamide resin, or a polyimide resin alone or in combination, rather than a resin such as an epoxy resin, which is easily deteriorated by ultraviolet rays or the like.

In general, the end portion of the coating film is weak against physical impact such as contact with an object, and the coating film is likely to be worn or partially peeled. In order to prevent this, it is considered that the coating film layer becomes thicker toward the end portion. Since the coating film evaluation structure according to the above-described embodiment is configured such that the area of each sheet constituting the laminate embedded in the coating film layer gradually reduces in the lamination direction and a stepped portion is provided at an end portion, the coating film layer becomes thicker toward the end portion, thereby preventing wear and partial peeling of the coating film as described above.

As described above, it was checked that the wear amount of the coating film using the coating film evaluation structure can be evaluated by the accelerated weather resistance test, but in actual inspection of infrastructure facilities, by attaching the coating film evaluation structure of embodiments of the present invention to bridges, steel towers, or the like, or in the vicinity thereof, where the coating film whose film thickness is to be managed is formed, the film thickness wear state can be evaluated. The attaching place is desirably a place where deterioration is likely to progress, such as a south side where sunlight is likely to hit and a place that is likely to get wet from rain. Further, at the time when the coating film is formed on the actual infrastructure facility, only the laminate of a plurality of sheets can be disposed at a predetermined depth of the film when the laminate is formed in advance. In this case, the decrease in thickness of the coating film to be evaluated can be evaluated by checking the exposure of the laminate accompanying the wear of the coating film of the actual infrastructure facility.

Here, it is important that the target coating film and the coating film layer of the coating film evaluation structure are made of the same paint. For example, when the target coating film is formed by the overcoating of a plurality of paints, the coating film layer is formed with the same coating specifications.

Further, if it is desirable to perform re-coating when the film thickness wear exceeds 80 μm, the thicknesses of the coating film layer of the coating film evaluation structure and each sheet are set so that a predetermined sheet is exposed before or after the wear of the coating film layer reaches 80 μm. Thus, it is possible to easily determine the necessity of re-coating from the exposure state of each sheet.

For example, if a structure coated with an ultra-thick film type epoxy resin paint of 500 μm is an object, test pieces obtained by thinning the film thickness of the ultra-thick film type epoxy resin paint of 100 μm, 200 μm, or the like are separately prepared, and these can be subjected to accelerated corrosion tests and the like to evaluate for desired durability and determine the amount of wear that requires re-coating.

As described above, since an area of each sheet of a laminate including a plurality of laminated sheets constituting the coating film evaluation structure gradually reduces in a lamination direction to provide a stepped portion at an end portion, and a coating film to be evaluated and the plurality of sheets have different colors, the evaluation of the film thickness of the coating film can be more easily performed.

Also, it is apparent that embodiments of the present invention are not limited to the embodiments described above, and many modifications and combinations can be carried out by those having ordinary knowledge in the art within the technical idea of embodiments of the present invention.

REFERENCE SIGNS LIST

101 Laminate
102 Coating film layer
103 Adhesive layer
11 First sheet
112 Second sheet
113 Third sheet

The invention claimed is:

1. A coating film evaluation structure for evaluating a decrease in thickness of a coating film, the structure comprising:

- a laminate comprising a plurality of sheets laminated together;
- a coating film layer on a first sheet of the plurality of sheets having a largest area among the plurality of sheets, the coating film layer covering remaining sheets of the plurality of sheets, wherein the coating film layer has a flat surface and comprises a same material as the coating film;
- wherein areas of each of the sheets in the laminate become smaller along a lamination direction and a stepped portion is provided at an end portion of the laminate;
- wherein the coating film and each of the sheets have different colors; and
- wherein each of the sheets has a known thickness.

2. The structure according to claim 1, wherein a second sheet of the plurality of sheets having a smaller area is disposed at a center portion of the first sheet having a larger area in a plan view.

3. The structure according to claim 2, wherein each sheet of the plurality of sheets comprises a polymer material containing any of a hydroxyl group, an amino group, a carboxyl group, a carbonyl group, an ether bond, an ester bond, a urethane bond, a urea bond, an aromatic ring, an amide bond, and an imide bond.

4. The structure according to claim 3, wherein the polymer material comprises any of a polyester resin, a polyurethane resin, an acrylic resin, a fluorine resin, a silicone resin, alkyl silicate, acrylic silicate, an acrylic styrene resin, a styrene resin, a melamine resin, a polyamide resin, and a polyimide resin, or a composite thereof.

5. The structure according to claim 1, wherein each sheet of the plurality of sheets comprises a polymer material containing any of a hydroxyl group, an amino group, a carboxyl group, a carbonyl group, an ether bond, an ester bond, a urethane bond, a urea bond, an aromatic ring, an amide bond, and an imide bond.

6. The structure according to claim 5, wherein an ultraviolet absorber or a light stabilizer is added to each sheet of the plurality of sheets.

7. The structure according to claim 5, wherein the polymer material comprises any of a polyester resin, a polyurethane resin, an acrylic resin, a fluorine resin, a silicone resin, alkyl silicate, acrylic silicate, an acrylic styrene resin, a styrene resin, a melamine resin, a polyamide resin, and a polyimide resin, or a composite thereof.

8. The structure according to claim 1, further comprising an adhesive layer on a first surface of the first sheet of the plurality of sheets, wherein the first surface is opposite a second surface on which the coating film layer is provided.

9. A coating film evaluation method for evaluating a decrease in thickness of a coating film, the method comprising:

installing a coating film evaluation structure in a vicinity of a structure on which the coating film is provided, wherein the coating film evaluation structure comprises:

a laminate comprising a plurality of sheets laminated together, wherein areas of each of the sheets in the laminate become smaller along a lamination direction and a stepped portion is provided at an end portion of the laminate, wherein the coating film and each of the sheets have different colors, and wherein each of the sheets has a known thickness; and a coating film layer on a first sheet of the plurality of sheets having a largest area among the plurality of sheets, the coating film layer covering remaining sheets of the plurality of sheets, wherein the coating film layer has a flat surface and comprises a same material as the coating film; and evaluating an exposed state of the plurality of sheets due to a decrease in a thickness of the coating film layer by checking colors of the plurality of sheets after installing the coating film evaluation structure.

10. The method according to claim 9, wherein each sheet of the plurality of sheets comprises a polymer material containing any of a hydroxyl group, an amino group, a carboxyl group, a carbonyl group, an ether bond, an ester bond, a urethane bond, a urea bond, an aromatic ring, an amide bond, and an imide bond.

11. The method according to claim 10, wherein the polymer material comprises any of a polyester resin, a polyurethane resin, an acrylic resin, a fluorine resin, a silicone resin, alkyl silicate, acrylic silicate, an acrylic styrene resin, a styrene resin, a melamine resin, a polyamide resin, and a polyimide resin, or a composite thereof.

12. The method according to claim 9, wherein a second sheet of the plurality of sheets having a smaller area is disposed at a center portion of the first sheet having a larger area in a plan view.

13. The method according to claim 12, wherein each sheet of the plurality of sheets comprises a polymer material containing any of a hydroxyl group, an amino group, a carboxyl group, a carbonyl group, an ether bond, an ester bond, a urethane bond, a urea bond, an aromatic ring, an amide bond, and an imide bond.

14. The method according to claim 13, wherein the polymer material comprises any of a polyester resin, a polyurethane resin, an acrylic resin, a fluorine resin, a silicone resin, alkyl silicate, acrylic silicate, an acrylic styrene resin, a styrene resin, a melamine resin, a polyamide resin, and a polyimide resin, or a composite thereof.

15. The method according to claim 13, wherein an ultraviolet absorber or a light stabilizer is added to each sheet of the plurality of sheets.

16. The method according to claim 12, further comprising an adhesive layer on a first surface of the first sheet of the plurality of sheets, wherein the first surface is opposite a second surface on which the coating film layer is provided.

17. A coating film evaluation method for evaluating a decrease in thickness of a coating film, the method comprising:

installing a coating film evaluation structure in a vicinity of a structure on which the coating film is provided, wherein the coating film evaluation structure comprises:

a laminate comprising a plurality of sheets laminated together, wherein areas of each of the sheets in the laminate become smaller along a lamination direction and a stepped portion is provided at an end portion of the laminate, wherein the coating film and each of the sheets have different colors, and wherein each of the sheets has a known thickness;

a coating film layer on a first surface of a first sheet of the plurality of sheets having a largest area among the plurality of sheets, the coating film layer covering remaining sheets of the plurality of sheets, wherein the coating film layer has a flat surface and comprises a same material as the coating film; and an adhesive layer on a second surface of the first sheet of the plurality of sheets, wherein the second surface is opposite the first surface; and evaluating an exposed state of the plurality of sheets due to a decrease in a thickness of the coating film layer by checking colors of the plurality of sheets after installing the coating film evaluation structure.

* * * * *